US012619644B2

(12) United States Patent
Ou et al.

(10) Patent No.: US 12,619,644 B2
(45) Date of Patent: May 5, 2026

(54) TEXT RECOMMENDATION METHOD AND APPARATUS, MODEL TRAINING METHOD AND APPARATUS, AND READABLE STORAGE MEDIUM

(71) Applicants: Beijing BOE Technology Development Co., Ltd., Beijing (CN); BOE Technology Group Co., Ltd., Beijing (CN)

(72) Inventors: Ge Ou, Beijing (CN); Boran Jiang, Beijing (CN); Chao Ji, Beijing (CN); Shuqi Wei, Beijing (CN); Hongxiang Shen, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 130 days.

(21) Appl. No.: 18/291,902

(22) PCT Filed: Sep. 18, 2021

(86) PCT No.: PCT/CN2021/119434
§ 371 (c)(1),
(2) Date: Jan. 24, 2024

(87) PCT Pub. No.: WO2023/039901
PCT Pub. Date: Mar. 23, 2023

(65) Prior Publication Data
US 2024/0362259 A1    Oct. 31, 2024

(51) Int. Cl.
*G06F 16/335* (2019.01)
(52) U.S. Cl.
CPC .................................. *G06F 16/335* (2019.01)

(58) Field of Classification Search
None
See application file for complete search history.

(56) References Cited

U.S. PATENT DOCUMENTS

2019/0378010 A1    12/2019    Morris et al.
2020/0125575 A1 *   4/2020    Ghoshal ............ G06F 16/24573
2021/0365818 A1 *  11/2021    Liu ........................ G06N 3/047

FOREIGN PATENT DOCUMENTS

CN          110222160 A      9/2019
CN          111159425 A      5/2020
(Continued)

OTHER PUBLICATIONS

PCT/CN2021/119434 international search report dated Oct. 10, 2022.
CN 202180002661.6 first office action dated Nov. 29, 2025.

*Primary Examiner* — Kannan Shanmugasundaram
(74) *Attorney, Agent, or Firm* — IPro, PLLC

(57) ABSTRACT

Provided in the present disclosure are a text recommendation method and apparatus, a model training method and apparatus, and a readable storage medium. The text recommendation method includes: acquiring text retrieval information from a user; when it is determined that there is historical text retrieval information for the user, determining text information of each text in a text set retrieved by using the text retrieval information; performing embedded representation on the text information of each text based on a self-attention model, and determining a text embedding vector of each text; inputting the text embedding vector of each text into a trained graph convolutional network model, to obtain the probability of interaction between the user and each text in the text set; and screening out, from the text set, target text which meets a preset interaction probability, and recommending the target text to the user.

16 Claims, 8 Drawing Sheets

(56)         References Cited

FOREIGN PATENT DOCUMENTS

| | | | |
|---|---|---|---|
| CN | 111581343 A | 8/2020 | |
| CN | 112232925 A | 1/2021 | |
| CN | 112487199 A | 3/2021 | |
| CN | 112488791 A | 3/2021 | |
| CN | 113362131 A | 9/2021 | |
| CN | 113392929 A | 9/2021 | |
| EP | 1079314 A2 * | 2/2001 | ........... G06F 16/355 |

* cited by examiner

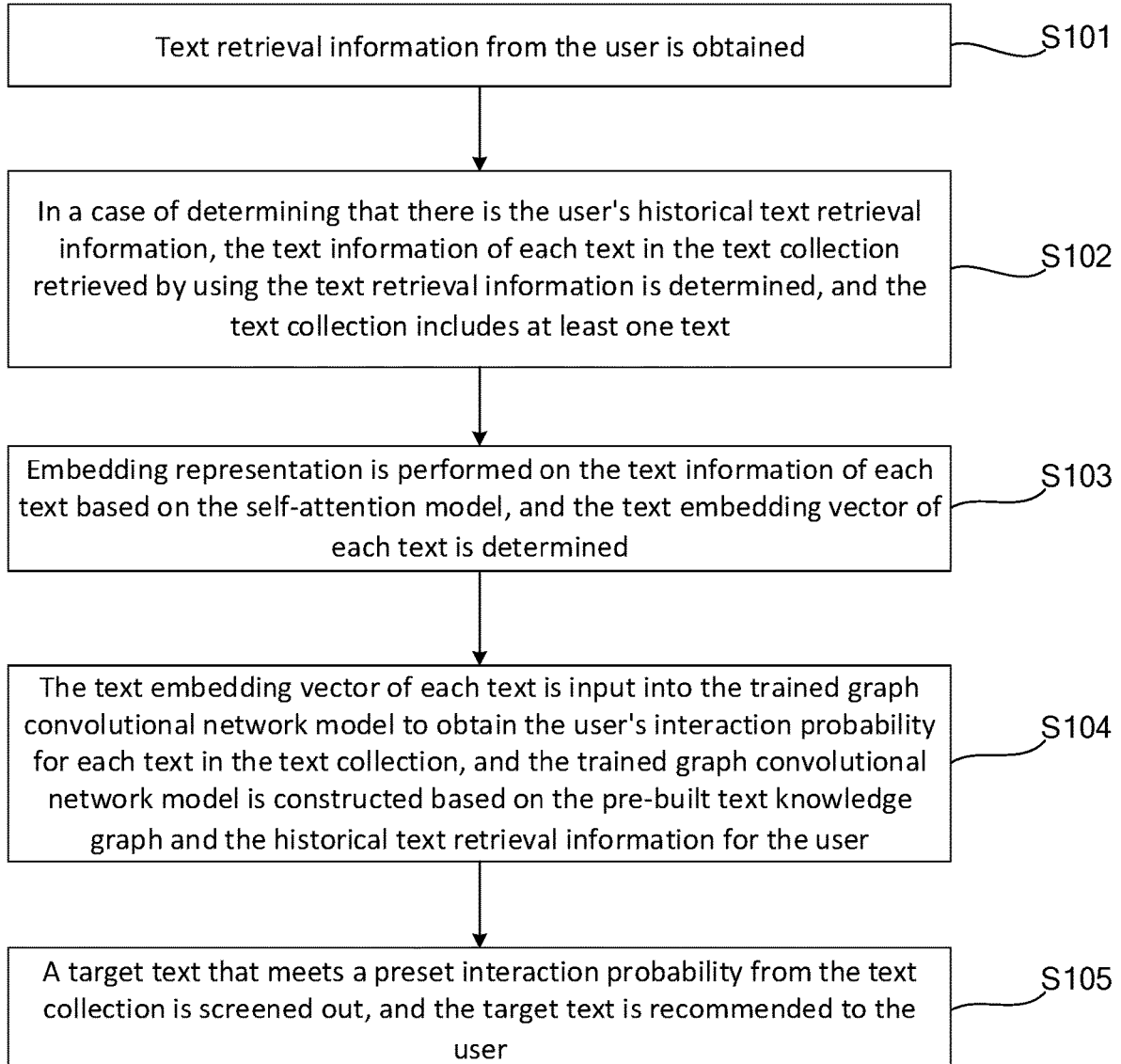

Text retrieval information from the user is obtained — S101

In a case of determining that there is the user's historical text retrieval information, the text information of each text in the text collection retrieved by using the text retrieval information is determined, and the text collection includes at least one text — S102

Embedding representation is performed on the text information of each text based on the self-attention model, and the text embedding vector of each text is determined — S103

The text embedding vector of each text is input into the trained graph convolutional network model to obtain the user's interaction probability for each text in the text collection, and the trained graph convolutional network model is constructed based on the pre-built text knowledge graph and the historical text retrieval information for the user — S104

A target text that meets a preset interaction probability from the text collection is screened out, and the target text is recommended to the user — S105

FIG. 1

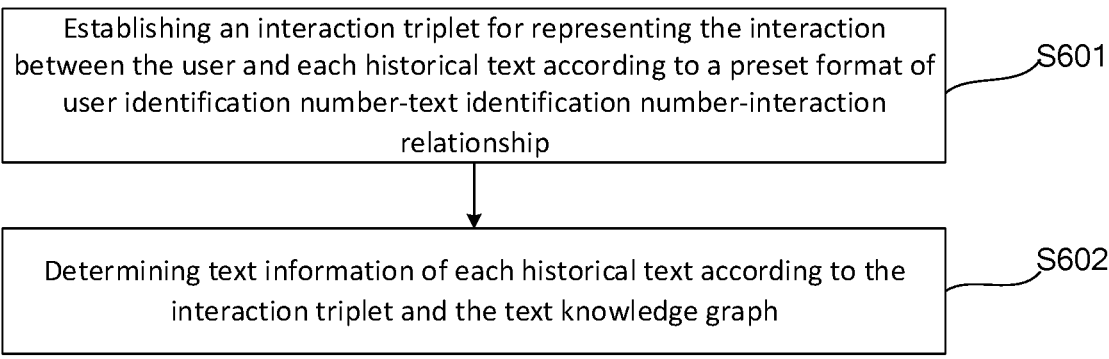

Establishing an interaction triplet for representing the interaction between the user and each historical text according to a preset format of user identification number-text identification number-interaction relationship ⟋S601

Determining text information of each historical text according to the interaction triplet and the text knowledge graph ⟋S602

FIG. 6

Determining the text identification number of each historical text from the interaction triplet ⟋S701

Determining the text information of the historical text from the text knowledge graph according to the text identification number of each historical text ⟋S702

FIG. 7

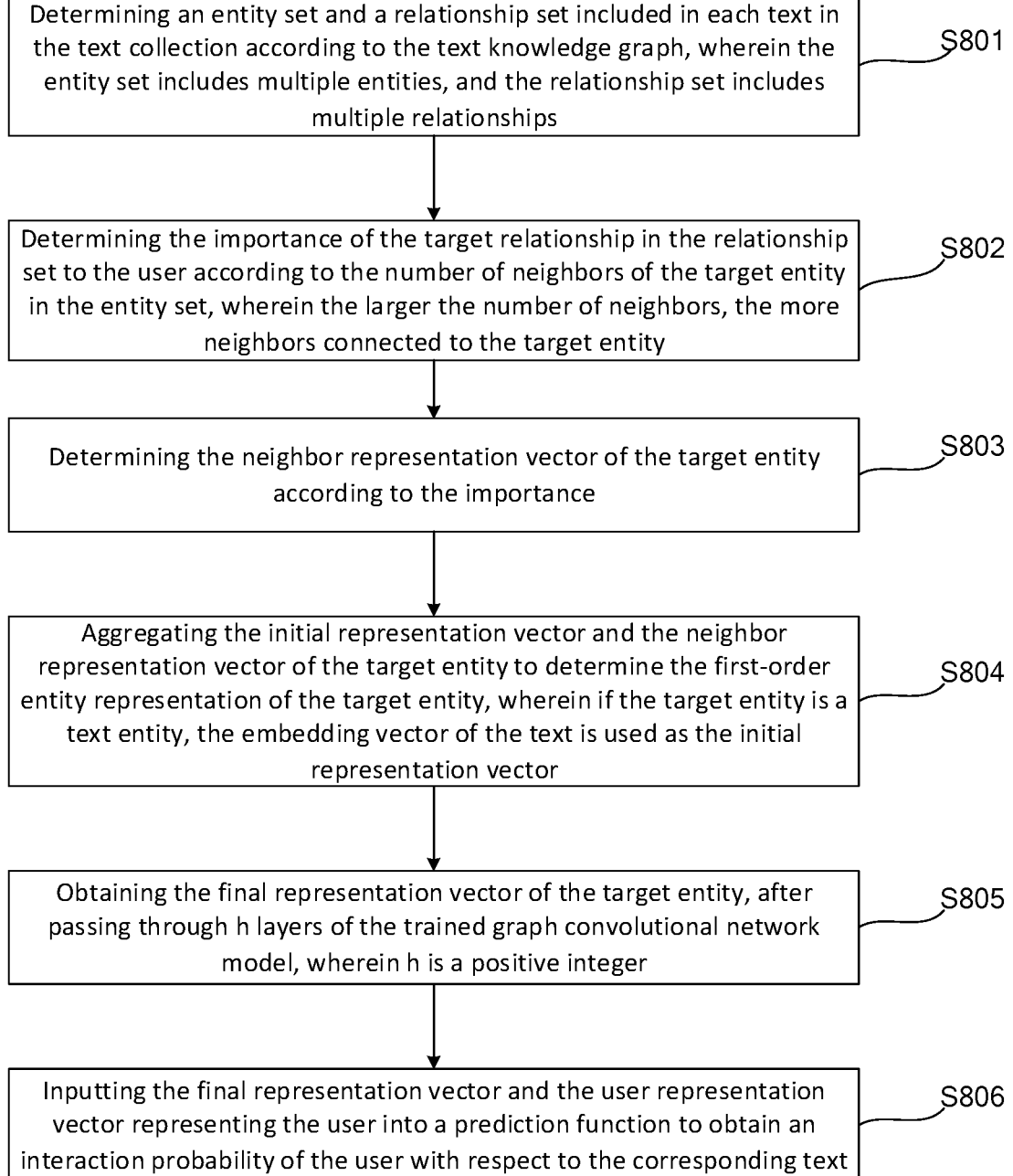

Determining an entity set and a relationship set included in each text in the text collection according to the text knowledge graph, wherein the entity set includes multiple entities, and the relationship set includes multiple relationships — S801

Determining the importance of the target relationship in the relationship set to the user according to the number of neighbors of the target entity in the entity set, wherein the larger the number of neighbors, the more neighbors connected to the target entity — S802

Determining the neighbor representation vector of the target entity according to the importance — S803

Aggregating the initial representation vector and the neighbor representation vector of the target entity to determine the first-order entity representation of the target entity, wherein if the target entity is a text entity, the embedding vector of the text is used as the initial representation vector — S804

Obtaining the final representation vector of the target entity, after passing through h layers of the trained graph convolutional network model, wherein h is a positive integer — S805

Inputting the final representation vector and the user representation vector representing the user into a prediction function to obtain an interaction probability of the user with respect to the corresponding text — S806

FIG. 8

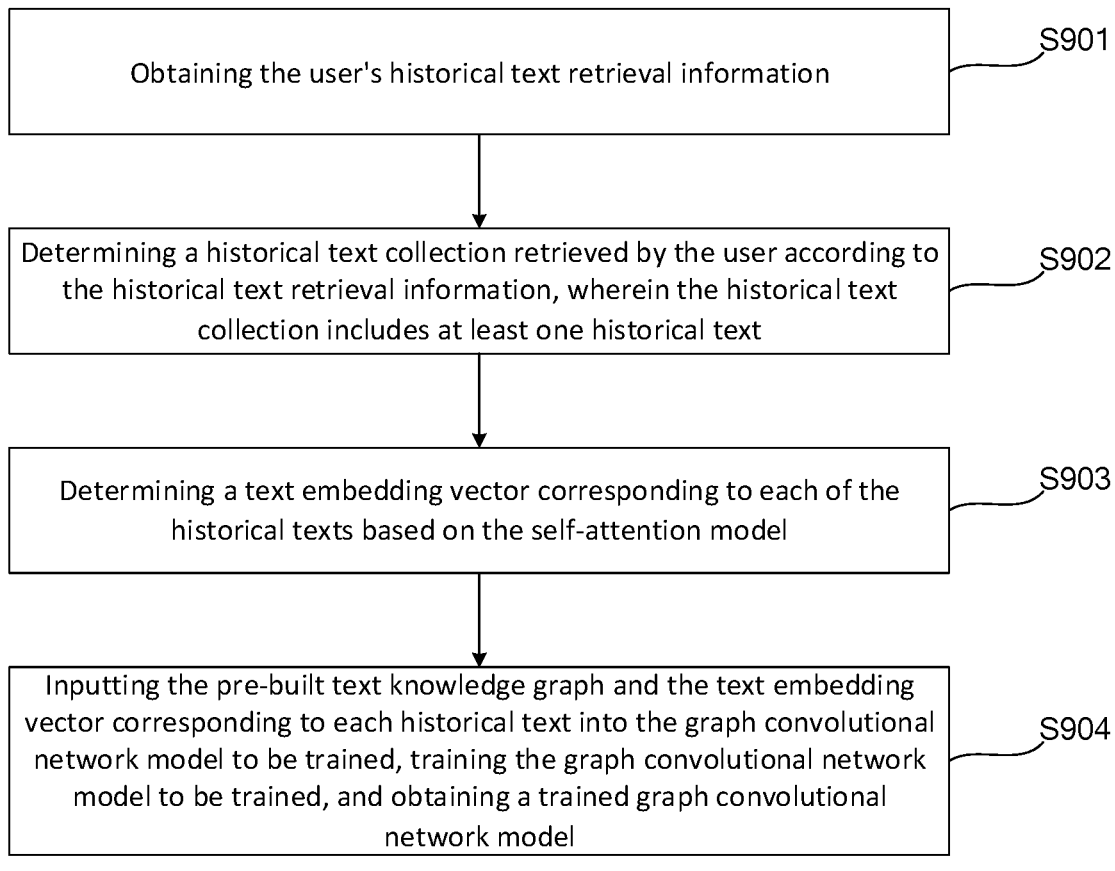

Obtaining the user's historical text retrieval information — S901

Determining a historical text collection retrieved by the user according to the historical text retrieval information, wherein the historical text collection includes at least one historical text — S902

Determining a text embedding vector corresponding to each of the historical texts based on the self-attention model — S903

Inputting the pre-built text knowledge graph and the text embedding vector corresponding to each historical text into the graph convolutional network model to be trained, training the graph convolutional network model to be trained, and obtaining a trained graph convolutional network model — S904

FIG. 9

Establishing an interaction triplet for representing the interaction between the user and each historical text according to the preset format of user identification number-text identification number-interaction relationship — S1001

Determining text information of each historical text according to the interaction triplet and the text knowledge graph — S1002

FIG. 10

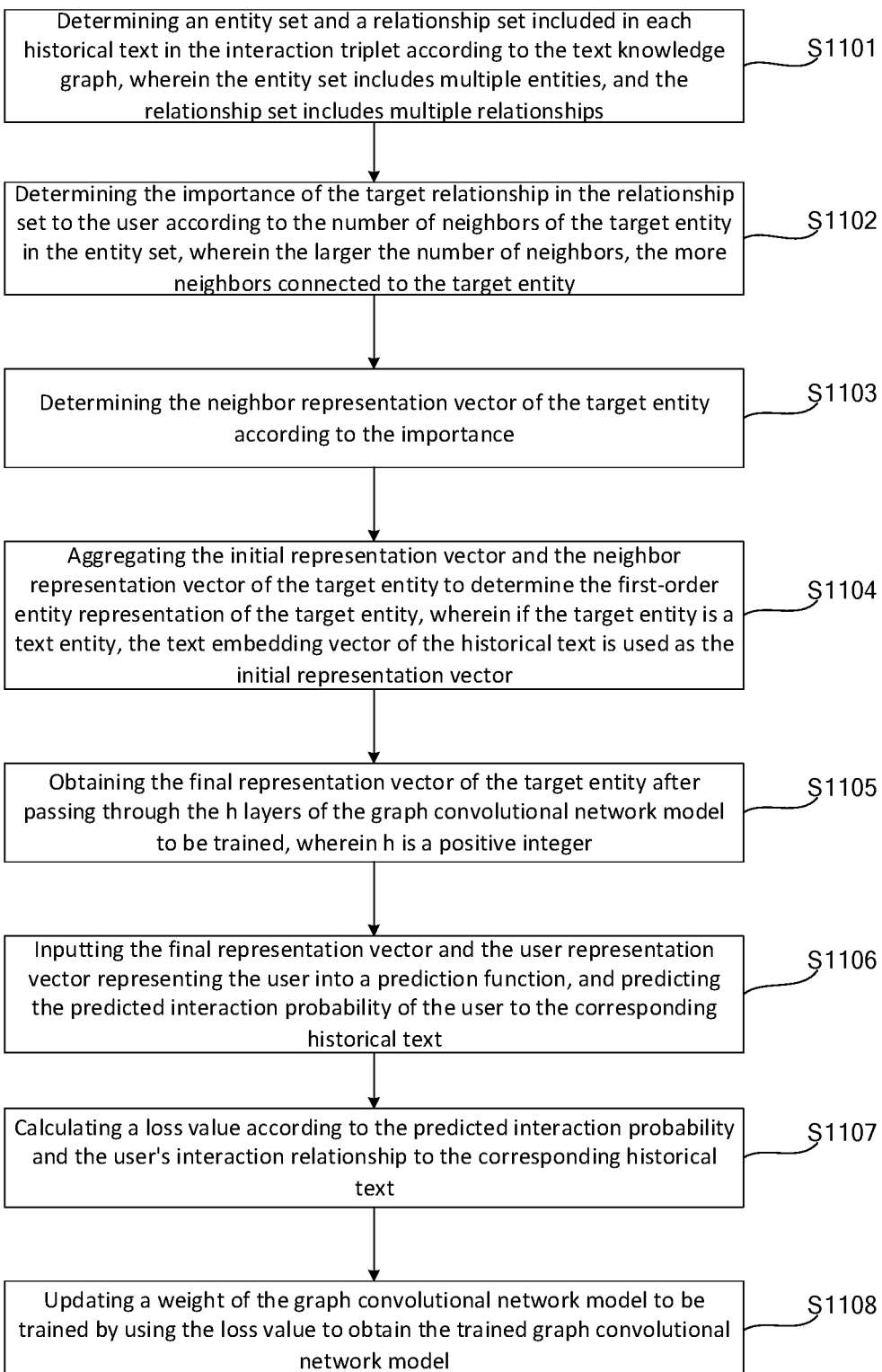

Determining an entity set and a relationship set included in each historical text in the interaction triplet according to the text knowledge graph, wherein the entity set includes multiple entities, and the relationship set includes multiple relationships — S1101

Determining the importance of the target relationship in the relationship set to the user according to the number of neighbors of the target entity in the entity set, wherein the larger the number of neighbors, the more neighbors connected to the target entity — S1102

Determining the neighbor representation vector of the target entity according to the importance — S1103

Aggregating the initial representation vector and the neighbor representation vector of the target entity to determine the first-order entity representation of the target entity, wherein if the target entity is a text entity, the text embedding vector of the historical text is used as the initial representation vector — S1104

Obtaining the final representation vector of the target entity after passing through the h layers of the graph convolutional network model to be trained, wherein h is a positive integer — S1105

Inputting the final representation vector and the user representation vector representing the user into a prediction function, and predicting the predicted interaction probability of the user to the corresponding historical text — S1106

Calculating a loss value according to the predicted interaction probability and the user's interaction relationship to the corresponding historical text — S1107

Updating a weight of the graph convolutional network model to be trained by using the loss value to obtain the trained graph convolutional network model — S1108

FIG. 11

TEXT RECOMMENDATION METHOD AND APPARATUS, MODEL TRAINING METHOD AND APPARATUS, AND READABLE STORAGE MEDIUM

CROSS-REFERENCE TO RELATED APPLICATIONS

The disclosure is a National Stage of International Application No. PCT/CN2021/119434, filed on Sep. 18, 2021, the content of which is hereby incorporated by reference in its entirety.

TECHNICAL FIELD

The present disclosure relates to the field of computer technology, in particular to a text recommendation method and apparatus, a model training method and apparatus, and a readable storage medium.

BACKGROUND

With the rapid development of the Internet technology, people can easily obtain a large amount of information such as news and commodities without leaving home. In order to effectively improve the user experience, the recommender system is often used to screen out the fields and content that the user is interested in from a large amount of information to make targeted recommendations to the user.

SUMMARY

The present disclosure provides a text recommendation method and apparatus, a model training method and apparatus, and a readable storage medium for improving the accuracy of the text recommendation result.

In a first aspect, embodiments of the present disclosure provide a text recommendation method, which includes:

obtaining text retrieval information from a user;

determining text information of each text in a text collection retrieved by using the text retrieval information in a case of determining there is historical text retrieval information of the user, wherein the text collection includes at least one text;

performing an embedding representation on the text information of each text based on a self-attention model to determine a text embedding vector of each text;

inputting the text embedding vector of each text into a trained graph convolutional network model to obtain an interaction probability of the user for each text in the text collection, wherein the trained graph convolutional network model is constructed based on a pre-built text knowledge graph and the historical text retrieval information for the user; and screening out a target text meeting a preset interaction probability from the text collection, and recommending the target text to the user.

In a possible implementation, after determining the text information of each text in the text collection retrieved by using the text retrieval information, the method further includes:

extracting summary information from the text information of each text, wherein the summary information represents a generalized expression of the text;

wherein the performing of the embedding representation on the text information of each text based on the self-attention model to determine the text embedding vector of each text, includes:

performing an embedding representation on the summary information of each text based on the self-attention model to determine a summary embedding vector of each text, and using the summary embedding vector as the text embedding vector of the text.

In a possible implementation, before performing the embedding representation on the text information of each text based on the self-attention model to determine the text embedding vector of each text, the method further includes:

performing data cleaning on the text information of each text, removing stop words, and obtaining cleaned data; and determining a corresponding word embedding vector according to the cleaned data of the text information of each text.

In a possible implementation, the determining of the corresponding word embedding vector according to the cleaned data of the text information of each text, includes:

segmenting the cleaned data of the text information of each text into words, and converting each of the words in the cleaned data into a corresponding word identification number according to dictionary information of the self-attention model; and using the word identification number as a word embedding vector of the text information.

In a possible implementation, after converting each word in the cleaned data into the corresponding word identification number, the method further includes:

determining an identification number sequence corresponding to the text information of each text and a corresponding sequence length; and processing the cleaned data corresponding to the text information of each text to adjust the corresponding identification number sequence to a preset sequence length.

In a possible implementation, before obtaining the text retrieval information from the user, the method further includes:

constructing the text knowledge graph according to a preset text resource library, wherein the text knowledge graph includes multiple triplets in a format of head entity-relationship-tail entity, and each of the multiple triplets includes an entity set including a head entity and a tail entity and a relationship set representing a relationship between the head entity and the tail entity.

In a possible implementation, before obtaining the text retrieval information from the user, the method further includes:

obtaining the historical text retrieval information of the user;

determining a historical text collection retrieved by the user according to the historical text retrieval information, wherein the historical text collection includes at least one historical text;

determining a text embedding vector corresponding to each of the historical texts based on the self-attention model; and inputting the text knowledge graph and the text embedding vector corresponding to each of the historical texts into a graph convolutional network model to be trained, training the graph convolutional network model to be trained, and obtaining the trained graph convolutional network model.

In a possible implementation, after determining the historical text collection retrieved by the user according to the historical text retrieval information, the method further includes:

establishing an interaction triplet for representing an interaction between the user and each of the historical texts according to a preset format of user identification number-text identification number-interaction relationship; and determining the text information of each of the historical texts according to the interaction triplet and the text knowledge graph.

In a possible implementation, the determining of the text information of each historical text according to the interaction triplet and the text knowledge graph, includes:

determining the text identification number of each historical text from the interaction triplet; and determining the text information of the historical text from the text knowledge graph according to the text identification number of each historical text.

In a possible implementation, the inputting of the text embedding vector of each text into the trained graph convolutional network model to obtain the interaction probability of the user for each text in the text collection, includes:

determining an entity set and a relationship set included in each text in the text collection according to the text knowledge graph, wherein the entity set includes a plurality of entities, and the relationship set includes a plurality of relationships;

determining an importance of a target relationship in the relationship set to the user according to the number of neighbors of the target entity in the entity set, wherein the larger the number of neighbors, the more neighbors connected to the target entity;

determining a neighbor representation vector of the target entity according to the importance;

aggregating an initial representation vector and the neighbor representation vector of the target entity to determine a first-order entity representation of the target entity, wherein in a case that the target entity is a text entity, the text embedding vector of the text is used as the initial representation vector;

obtaining a final representation vector of the target entity after passing through h layers of the trained graph convolutional network model, wherein h is a positive integer; and inputting the final representation vector and a user representation vector representing the user into a prediction function to obtain an interaction probability of the user to the corresponding text.

In a possible implementation, the importance of the target relationship in the relationship set to the user is determined by a following formula:

$$\pi_r^u = u \cdot r + \alpha r,$$

wherein u represents the user representation vector of the user, r represents the vector representation of the target relationship, and $\alpha$ represents the number of neighbors of the target entity.

In a possible implementation, the first-order entity representation of the target entity is determined by a following formula:

$$agg = \sigma\left(w\left(v + v_{S(v)}^u\right) + b\right),$$

wherein $\sigma$ represents an activation function, w and b represent trainable parameters, v represents the initial representation vector of the target entity, and $$v_{S(v)}^u$$

represents the neighbor representation vector of the target entity.

In the second aspect, embodiments of the present disclosure provide a model training method, including:

obtaining historical text retrieval information of a user;

determining a historical text collection retrieved by the user according to the historical text retrieval information, wherein the historical text collection includes at least one historical text;

determining a text embedding vector corresponding to each of the historical texts based on a self-attention model; and inputting a pre-built text knowledge graph and the text embedding vector corresponding to each of the historical texts into a graph convolutional network model to be trained, training the graph convolutional network model to be trained, and obtaining a trained graph convolutional network model.

In a possible implementation, after determining the historical text collection retrieved by the user according to the historical text retrieval information, the method further includes:

establishing an interaction triplet for representing an interaction between the user and each of the historical texts according to a preset format of user identification number-text identification number-interaction relationship; and determining text information of each of the historical texts according to the interaction triplet and the text knowledge graph.

In a possible implementation, an operation of inputting the pre-built text knowledge graph and the text embedding vector corresponding to each of the historical texts into the graph convolutional network model to be trained, training the graph convolutional network model to be trained, and obtaining the trained graph convolutional network mode, includes:

determining an entity set and a relationship set included in each of the historical texts in the interaction triplet according to the text knowledge graph, wherein the entity set includes a plurality of entities, and the relationship set includes a plurality of relationships;

determining an importance of a target relationship in the relationship set to the user according to the number of neighbors of the target entity in the entity set, wherein the larger the number of neighbors, the more neighbors connected to the target entity;

determining a neighbor representation vector of the target entity according to the importance;

aggregating an initial representation vector and the neighbor representation vector of the target entity to determine a first-order entity representation of the target entity, wherein in a case that the target entity is a text entity, the text embedding vector of the historical text is used as the initial representation vector;

obtaining a final representation vector of the target entity after passing through h layers of the graph convolutional network model to be trained, wherein h is a positive integer;

inputting the final representation vector and the user representation vector representing the user into a prediction function to predict a predicted interaction probability of the user to the corresponding historical text;

calculating a loss value according to the predicted interaction probability and the interaction relationship of the user to the corresponding historical text; and updating a weight of the graph convolutional network model to be trained by using the loss value to obtain the trained graph convolutional network model.

In the third aspect, embodiments of the present disclosure provide a text recommendation apparatus, including:

a first memory and a first processor;

wherein the first memory is configured to store computer programs; and the first processor is configured to execute the computer programs in the first memory to perform:

obtaining text retrieval information from a user;

determining text information of each text in a text collection retrieved by using the text retrieval information in a case of determining there is historical text retrieval information of the user, wherein the text collection includes at least one text;

determining a text embedding vector for each text based on a self-attention model;

inputting the text embedding vector of each text into a trained graph convolutional network model to obtain an interaction probability of the user for each text in the text collection, wherein the trained graph convolutional network model is constructed based on a pre-built text knowledge graph and the historical text retrieval information for the user; and screening out a target text meeting a preset interaction probability from the text collection, and recommending the target text the user.

In the fourth aspect, embodiments of the present disclosure provide a model training apparatus, including: a second memory and a second processor; wherein the second memory is configured to store computer programs; and the second processor is configured to execute the computer programs in the second memory to perform:

obtaining historical text retrieval information of a user;

determining a historical text collection retrieved by the user according to the historical text retrieval information, wherein the historical text collection includes at least one historical text;

determining a text embedding vector corresponding to each of the historical texts based on a self-attention model; and inputting a pre-built text knowledge graph and the text embedding vector corresponding to each of the historical texts into the graph convolutional network model to be trained, training the graph convolutional network model to be trained, and obtain the trained graph convolutional network model.

In the fifth aspect, embodiments of the present disclosure provide a computer-readable storage medium, wherein: the computer-readable storage medium stores computer instructions; and the computer instructions, when run on the computer, cause the computer to execute any text recommendation method described above or any model training method described above.

6

BRIEF DESCRIPTION OF FIGURES

FIG. 1 is a method flowchart of a text recommendation method provided by an embodiment of the present disclosure.

FIG. 6 is a flow chart of the method after step S502 in FIG. 5.

FIG. 7 is a method flowchart of step S602 in FIG. 6.

FIG. 8 is a method flowchart of step S504 in FIG. 5.

FIG. 9 is a method flowchart of a model training method provided by an embodiment of the present disclosure.

FIG. 10 is a flow chart of one of the methods after step S902 in FIG. 9.

FIG. 11 is a method flowchart of step S904 in FIG. 9.

DETAILED DESCRIPTION

Figure 2:
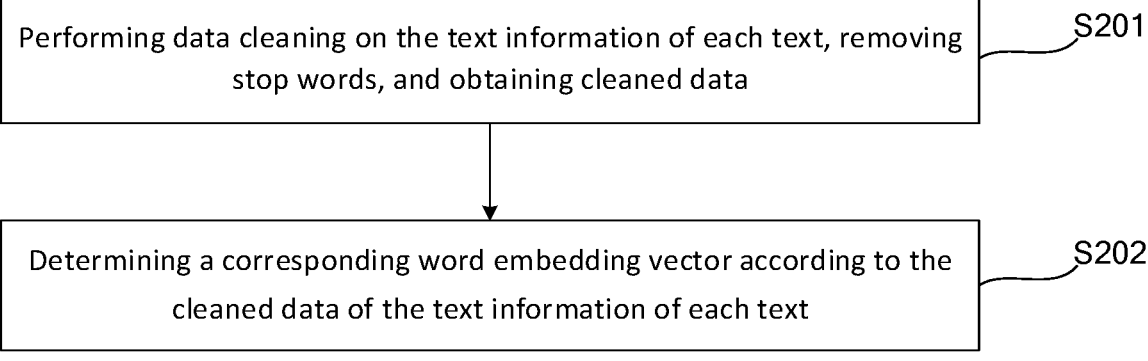
FIG. 2 is a flow chart of one of the methods before step S103 in FIG. 1.

In order to make the purpose, technical solutions and advantages of the embodiments of the present disclosure clearer, the following will clearly and completely describe the technical solutions of the embodiments of the present disclosure in conjunction with the accompanying drawings of the embodiments of the present disclosure. Apparently, the described embodiments are some of the embodiments of the present disclosure, not all of them. Moreover, in the case of no conflict, the embodiments in the present disclosure and the features in the embodiments can be combined with each other. Based on the described embodiments of the present disclosure, all other embodiments obtained by persons of ordinary skill in the art without creative effort fall within the protection scope of the present disclosure.

Unless otherwise defined, the technical terms or scientific terms used in the present disclosure shall have the usual meanings understood by those skilled in the art to which the present disclosure belongs. The words "including" or "comprising" and similar words used in the present disclosure mean that the elements or things appearing before the word include the elements or things listed after the word and their equivalents, without excluding other elements or things.

It should be noted that the size and shape of each figure in the drawings do not reflect the true scale, but are only intended to illustrate the present disclosure. And the same or similar reference numerals represent the same or similar elements or elements having the same or similar functions throughout.

In related technologies, the knowledge graph is introduced into the recommender system as additional information to realize the personalized recommendation of items, which can alleviate the problems of cold start and sparse matrix to a certain extent. For a knowledge graph convolutional network model that combines knowledge graphs and graph convolutions, such as the KGCN model, its core idea is to introduce knowledge graphs into graph convolutional networks by selectively aggregating neighborhood information, and the structural information and semantic information of the knowledge graph are learnt to mine the potential interests of users. However, when the existing KGCN model is trained, the initial entity vector, the user vector and the relationship vector are assigned with values by randomly initialization, ignoring the possible fusion of text data, resulting in the low accuracy of the text recommendation result. In view of this, embodiments of the present disclosure provide a text recommendation method and apparatus, a model training method and apparatus, and a readable storage medium for improving the accuracy of the text recommendation result.

FIG. 1 illustrates a flowchart of a text recommendation method provided by an embodiment of the present disclosure. The text recommendation method can be applied to a text recommender system based on a self-attention model and a KGCN model. The text recommendation method includes followings.

S101: Text retrieval information from the user is obtained.

The text retrieval information may be text information such as keywords, classification numbers of international patent classification (IPC), inventor names, etc. Specifically, the corresponding text retrieval information may be input according to the actual needs of the user, which is not limited here.

S102: In a case of determining that there is the user's historical text retrieval information, the text information of each text in the text collection retrieved by using the text retrieval information is determined, and the text collection includes at least one text.

When it is determined that there is the user's historical text retrieval information, the user is an old user who has used the text recommender system, and the text information of each text in the text collection retrieved by using the text retrieval information can be determined. The above-mentioned text information may be all contents in the corresponding text, and may also be part of the contents in the corresponding text; and the extraction of the contents in the text may be set according to the actual application needs of the user, which is not limited here.

S103: Embedding representation is performed on the text information of each text based on the self-attention model, and the text embedding vector of each text is determined.

The self-attention model can be pre-built; and can be a BERT model, and can also be a Transformer model, which is not limited here.

S104: The text embedding vector of each text is input into the trained graph convolutional network model to obtain the user's interaction probability for each text in the text collection, and the trained graph convolutional network model is constructed based on the pre-built text knowledge graph and the historical text retrieval information for the user.

The trained graph convolutional network model is constructed based on the pre-built text knowledge graph and the historical text retrieval information for the user, and the trained graph convolutional network model may be based on the KGCN model. The text embedding vector of each text is input into the trained graph convolutional network model, and the interaction probability of each text in the text collection for the user can be obtained. According to the interaction probability, it can be determined whether the user is interested in the corresponding text. For example, if the interaction probability is "1", it indicates that the user is interested in the corresponding text; for another example, if the interaction probability is "0", it indicates that the user is not interested in the corresponding text.

S105: A target text that meets a preset interaction probability from the text collection is screened out, and the target text is recommended to the user.

After obtaining the user's interaction probability for each of the texts in the text collection, target texts that meet the preset interaction probability can be screened out from the text collection. For example, when the preset interaction probability is "1", the text with an interaction probability of "1" can be screened out from the text collection, and then the target text is recommended to the user. In this way, at least part of the texts interested by the user can be screened out from the text collection, and recommended to the user, so as to realize the targeted recommendation to the user. In addition, while realizing targeted text recommendation for users, since the text embedding vector is fused with the semantic information of the corresponding text, the text embedding vector is fused into the trained knowledge graph convolutional network model, which introduces rich semantic information to the trained knowledge graph convolutional network model, thereby improving the accuracy of the text recommendation result. In an embodiment of the present disclosure, performing embedding representation on the text information of each of the texts based on the self-attention model, and determining the text embedding vector of each of the texts, including:

performing a linear transformation on the input of the self-attention model to obtain a query matrix, a key matrix and a value matrix, obtaining a weight coefficient according to the query matrix and the key matrix, and determining the output of the self-attention model according to the weight coefficient and the value matrix, so that the text embedding vector can be obtained.

In the embodiment of the present disclosure, the input of the self-attention model as X, the query matrix as Q, the key matrix as K, and the value matrix as V are taken as an example to explain the process of obtaining the text embedding vector. The input X of the self-attention model can be obtained by text information based on one-hot encoding, word2vec, etc., or the input of the self-attention model can be determined based on the method mentioned below, which is not limited here. The input X of the self-attention model is linearly transformed to obtain a query matrix Q, a key matrix K and a value matrix V, and X is multiplied by weight matrices W to obtain the query matrix, the key matrix and the value matrix. For example, the query matrix $Q=X*W^Q$, the key matrix $K=x*W^K$, and the value matrix $V=X*W^V$. In some embodiments, the weight matrix W can be trained as a training parameter, so as to obtain different weight matrices $W^Q$, $W^K$, $W^V$. The output of the self-attention model is determined according to the weight coefficient and value matrix, and the output Z of the self-attention model can be obtained based on the following formula:

$$Z = softmaxQ \times KTd\, Z = softmax\left(\frac{Q \times K^T}{\sqrt{d_k}}\right) * V,$$

wherein $d_k$ is the dimension of the input X of the self-attention model.

In other embodiments of the present disclosure, after the output Z of the self-attention model passes through a feedforward neural network, a text embedding vector is obtained.

In an embodiment of the present disclosure, performing the embedding representation on the text information of each text based on the self-attention model to obtain a text embedding vector includes: applying network structures of the self-attention models, such as BERT, Transformer, etc., to perform the embedding representation on the text information of each text to obtain the text embedding vector, which is not limited in this disclosure.

In an embodiment of the present disclosure, after determining the text information of each text in the text collection retrieved by using the text retrieval information in step S102, the method further includes:

extracting summary information from the text information of each of the texts, wherein the summary information represents a generalized expression of the text;

wherein the performing of the embedded representation on the text information of each of the texts based on the self-attention model to determine the text embedding vector of each of the texts, includes:

performing the embedded representation on the summary information of each text based on the self-attention model, determining the summary embedding vector of each text, and using the summary embedding vector as the text embedding vector of the text.

In the specific implementation process, after determining the text information of each text in the text collection retrieved by using the text retrieval information, the summary information can also be extracted from the text information of each text, and the summary information represents the generalized expression of the text. The summary information can be such as abstract information in patent application documents, abstract information in papers, the introduction in a book, and the introduction in news; and the information of the corresponding part can be extracted from the text information of the text according to actual application needs, which is not limited here.

After extracting the summary information from the text information of each text, the embedding representation for the summary information of each text can be made based on the self-attention model, so as to determine the summary embedding vector of each text; and the summary embedding vector can be used as the text embedding vector of the text. Correspondingly, the summary embedding vector can be input into the trained graph convolutional network model, so as to realize the prediction of the interaction probability of each text in the text collection. Because the summary information not only belongs to part of the text information of the text, but also represents the general expression of the corresponding text, which often includes the main idea of the entire text, the summary embedding vector is fused into the trained knowledge graph convolutional network model, which introduces rich semantic information to the model, improves the accuracy of text recommendation result while improving the recommendation speed.

In the embodiment of the present disclosure, as shown in FIG. 2, before step S103: performing the embedding representation on the text information of each text based on the self-attention model, and determining the text embedding vector of each text, the method further includes:

S201: performing data cleaning on the text information of each text, removing stop words, and obtaining cleaned data; and S202: determining a corresponding word embedding vector according to the cleaned data of the text information of each text.

In the specific implementation process, the specific implementation process of step S201 to step S202 is as follows. First, data cleaning is performed on the text information of each of the texts in the text collection, stop words are removed, and cleaned data is obtained, wherein the stop words include English characters, numbers, numeric characters, punctuation marks, modal particles, adverbs, prepositions, conjunctions and single Chinese characters that are frequently used, etc. During text processing, if stop words are encountered, the processing is immediately stopped and discarding the stop words. After the stop words are discarded, the processing capacity is reduced and the processing efficiency is improved. After the cleaned data is obtained, a corresponding word embedding vector is determined according to the cleaned data of the text information of each text. Then, the word embedding vector corresponding to the text information of each text can be used as an input of the self-attention model, and then the text embedding vector corresponding to each text can be obtained based on the input of the self-attention model.

Figure 3:
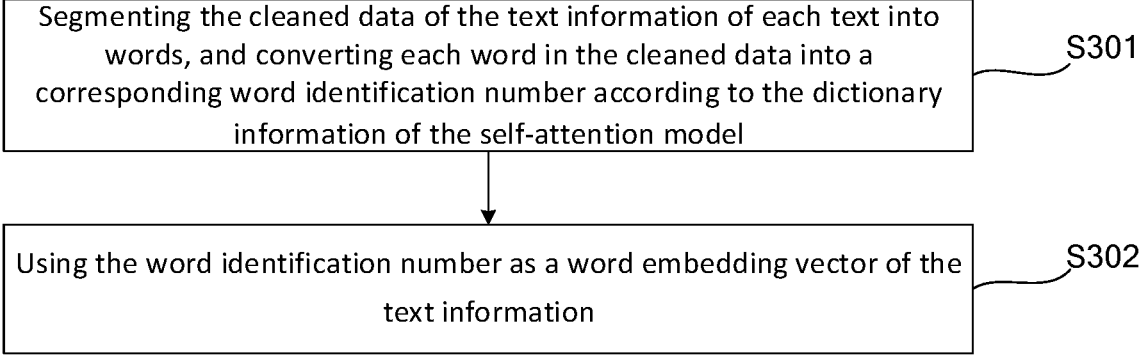
FIG. 3 is a method flowchart of step S202 in FIG. 2.

In the embodiment of the present disclosure, as shown in FIG. 3, step S202: determining the corresponding word embedding vector according to the cleaned data of the text information of each text, including:

S301: segmenting the cleaned data of the text information of each text into words, and converting each word in the cleaned data into a corresponding word identification number according to the dictionary information of the self-attention model; and S302: using the word identification number as a word embedding vector of the text information.

In the specific implementation process, the specific implementation process of step S301 to step S302 is as follows. First, the cleaned data of the text information of each text is segmented into words, and each word in the cleaned data is converted into a corresponding word identification number according to the dictionary information of the self-attention model, for example, the text collection includes text A, text B, and text C, and the words in the text information of text A, text B, and text C are converted into word identification numbers. Then, the word identification number of the corresponding text can be used as the word embedding vector of the text information. In addition, the result of random initialization based on the information of words in the text information at different positions in the corresponding text can be used as the position embedding vector of the corresponding text, thereby realizing determination of the word embedding vector and position embedding vector of the corresponding text, so as to realize the embedding representation of the text information of each text. In a specific implementation process, the result of the random initialization can be trained so as to obtain a better position embedding vector.

In other embodiments of the present disclosure, the word embedding vector of each text may be obtained based on methods such as one-hot encoding and word2vec, which is not limited here.

In other embodiments of the present disclosure, the position embedding vector of each text may be obtained by direct position encoding according to the position of each word in each of the texts, and the result after position encoding is used as the corresponding position embedding vector, which is not limited here.

After determining the word embedding vector and the position embedding vector of each of the texts, the sum of the word embedding vector and the position embedding vector of each of the texts can be used as the input of the self-attention model, to obtain the text embedding vector corresponding to the text based on the self-attention model.

It should be noted that, in addition to using the word embedding vector and the position embedding vector of each text as the input of the self-attention model, the sentence embedding vector of each text can also be determined, and the sum of the corresponding sentence embedding vector and the previously determined word embedding vector and position embedding vector is used as the input of the self-attention model. It can be that the cleaned data of the text information of each text is divided into words, and the corresponding sentence embedding vector is determined according to the dictionary information of the self-attention model. In this case, the sum of the word embedding vector, the position embedding vector and the sentence embedding vector corresponding to the text information of each text can be input to the self-attention model, to obtain the text embedding vector corresponding to each text. Herein, the sentence embedding vector can be determined according to the actual application situation. For example, in the process of extracting summary information from the text information of each text and performing text recommendation based on the summary embedding vector of the summary information, if the summary information is abstract information, and the abstract information usually only includes a single sentence, in this case, the sentence embedding vector corresponding to the abstract information can be set to 0. For the calculation of sentence embedding vectors in other cases, reference may be made to specific implementations in related technologies, which will not be described in detail here.

Figure 4:
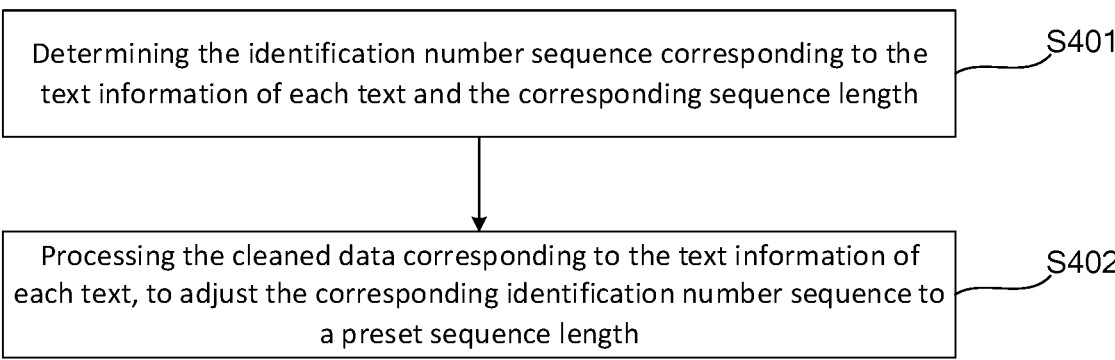
FIG. 4 is a flow chart of one of the methods after step S301 in FIG. 3.

In the embodiment of the present disclosure, as shown in FIG. 4, after converting each word in the cleaned data into a corresponding word identification number in step S301, the method further includes:

S401: determining the identification number sequence corresponding to the text information of each text and the corresponding sequence length; and

S402: processing the cleaned data corresponding to the text information of each text, to adjust the corresponding identification number sequence to a preset sequence length.

In the specific implementation process, the specific implementation process of step S401 to step S402 is as follows. After each word in the cleaned data corresponding to each text is converted into a corresponding word identification number, the identification number sequence corresponding to the text information of each text can be determined. For example, the text collection includes n texts, n is an integer greater than 1, the sequence lengths of the identification number sequences corresponding to n texts are $m_1$, $m_2, \ldots, m_n$ respectively, and the maximum sequence length among all identification number sequences is $m_{max}=\max\{m_1, m_2, \ldots, m_n\}$. Then, the cleaned data corresponding to the text information of each text is processed to adjust the corresponding identification number sequence to a preset sequence length, that is, each identification number sequence is adjusted to a uniform length. For example, the length of each identification number sequence can be set as len=max $\{$512, $m_{max}\}$. If the length of the identification number sequence is less than len, the text information corresponding to the identification number sequence will be filled with "0". If the length of the identification number sequence is greater than len, the text information corresponding to the identification number sequence is truncated, so that the length of each identification number sequence is len, thereby improving the processing rate of the self-attention model subsequently.

In the embodiment of the present disclosure, before step S101: obtaining the text retrieval information from the user, the method further includes:

constructing the text knowledge graph according to a preset text resource library, wherein the text knowledge graph includes multiple triplets in the format of head entity-relationship-tail entity, and the multiple triplets include an entity set including a head entity and a tail entity and a relationship set representing a relationship between the head entity and the tail entity.

In the specific implementation process, before obtaining the text retrieval information input by the user, the text knowledge graph is constructed according to the preset text resource library. The preset text resource library may be Wanfang database, and the Wanfang database includes paper resources. The preset text resource library can also be a patent database, and the patent resource library includes patent resources. Of course, text resource libraries in corresponding fields can also be used to construct corresponding text knowledge graphs according to actual application needs, which is not limited here. The text knowledge graph includes multiple triplets in the format of head entity-relationship-tail entity, and the format of each triplet can be expressed as G=(h, r, t), wherein h represents a head entity in a triplet, r represents the relationship in a triplet, and t represents the tail entity in a triplet. The multiple triplets include an entity set e including the head entity and the tail entity and the relationship set r representing the relationship between the head entity and the tail entity. The relationship set may include various relationships such as inventors, keywords, publication numbers, IPC classification numbers. For example, for a patent document (a medical image classifier based on deep learning, keywords, deep learning), "a medical image classifier based on deep learning" and "deep learning" represent entities, and "keywords" indicates a relationship. It should be noted that, in the text recommendation scenario involved in the embodiments of the present disclosure, the user and the text respectively correspond to an entity in the text knowledge graph.

Figure 5:
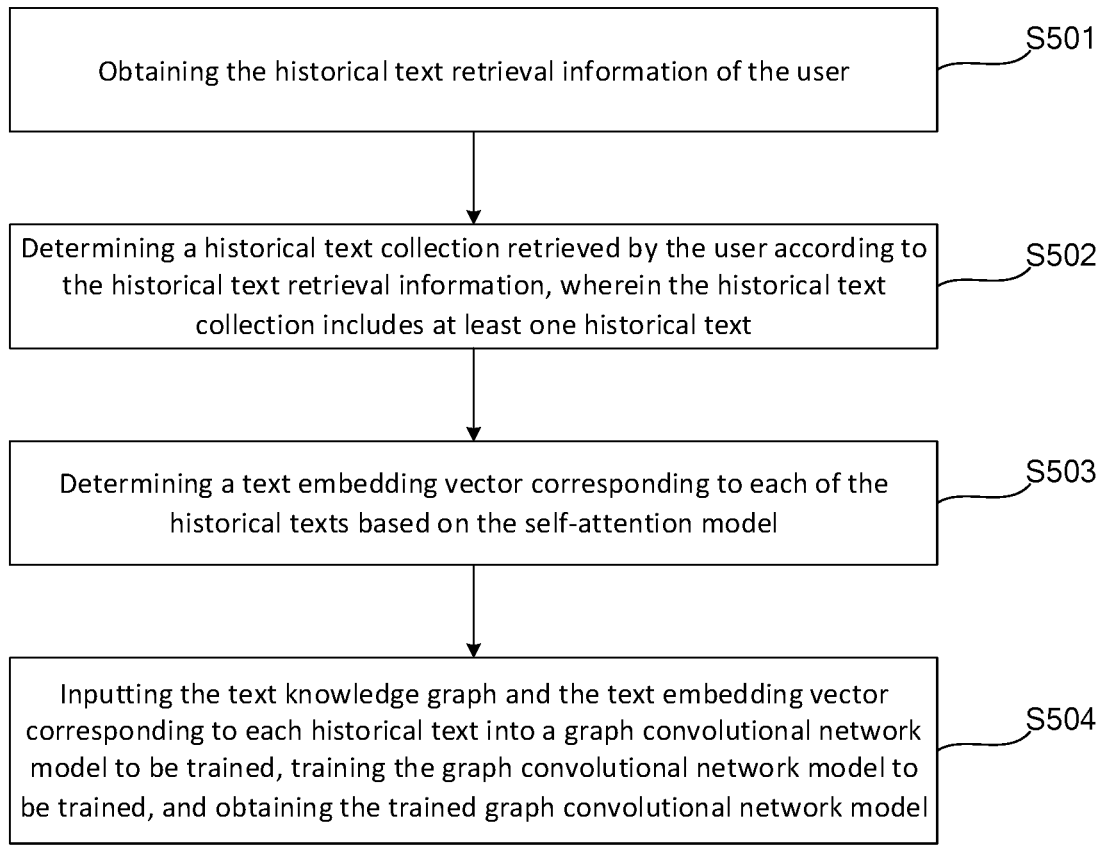
FIG. 5 is a flow chart of one of the methods after step S101 in FIG. 1.

In the embodiment of the present disclosure, as shown in FIG. 5, before step S101: obtaining the text retrieval information input by the user, the method further includes:

S501: obtaining the historical text retrieval information of the user;

S502: determining a historical text collection retrieved by the user according to the historical text retrieval information, wherein the historical text collection includes at least one historical text;

S503: determining a text embedding vector corresponding to each of the historical texts based on the self-attention model; and

S504: inputting the text knowledge graph and the text embedding vector corresponding to each historical text into a graph convolutional network model to be trained, training the graph convolutional network model to be trained, and obtaining the trained graph convolutional network model.

In the specific implementation process, the specific implementation process of step S501 to step S504 is as follows. Before obtaining the text retrieval information input by the user, obtaining the historical text retrieval information of the user may be achieved by collecting the historical browsing records of the user on the text recommender system, and obtaining the historical text retrieval information of the user according to the historical browsing records. Then, according to the historical text retrieval information, the historical text collection retrieved by the user is determined, and the historical text collection includes at least one historical text. Then, the text embedding vector corresponding to each of the historical texts is determined based on the self-attention model, herein, the text embedding vector corresponding to each of the historical texts can be determined by referring to the same technical implementation of the text embedding vector of the aforementioned text, which will not be repeated here. After determining the text embedding vector corresponding to each of the historical texts, the text knowledge graph and the text embedding vector corresponding to each of the historical texts can be input into the graph convolutional network model to be trained, and the graph convolutional network model to be trained is trained to obtain the trained graph convolutional network model. Since the trained graph convolutional network model is obtained based on the text knowledge graph and the text embedding vector of the historical text included in the user's historical text retrieval information, and the obtained graph convolutional network model fully considers the user's historical retrieval habits, and performs text recommendation according to the user's historical retrieval habits, thereby improving the accuracy of text recommendation through the trained graph convolutional network model for the user.

In the embodiment of the present disclosure, as shown in FIG. 6, after step S502: determining the historical text collection retrieved by the user according to the historical text retrieval information, the method further includes:

S601: establishing an interaction triplet for representing the interaction between the user and each historical text according to a preset format of user identification number-text identification number-interaction relationship; and

S602: determining text information of each historical text according to the interaction triplet and the text knowledge graph.

In the specific implementation process, the specific implementation process of step S601 to step S602 is as follows. After determining the historical text collection retrieved by the user, according to the preset format of user identification number-text identification number-interaction relationship, an interaction triplet used to represent the interaction between the user and each of the historical texts is established. The preset format is a format preset according to actual needs. For example, the preset format may be (user id, text id, whether there is interaction y). For example, if the number of users is p and the number of texts is q, there are p*q triplets in total, wherein p and q are both positive integers. Then, according to the interaction triplet and the text knowledge graph, the text information of each of the historical texts is determined. In this way, the construction of the user-text interaction data is realized by using the historical text retrieval information of the user.

It should be noted that, after determining the historical text collection retrieved by the user, in addition to directly constructing the interaction triplet, a user-historical text interaction matrix may be first constructed, and then according to the user-historical text interaction matrix, the triplet is constructed. The rows in the interaction matrix can be expressed as user identification numbers, the columns in the interaction matrix can be expressed as text identification numbers, and the elements in the interaction matrix indicate whether there is interaction. Still taking the above example as an example, the p*q-dimensional user-historical text interaction matrix can be constructed. The number of users is p, the number of texts is q, y=1 means there is interaction, and y=0 means there is no interaction; and the label y representing where is interaction is used to determine whether the user is interested in the corresponding historical text.

In the specific implementation process, a set of interactive actions including browsing, downloading, and no interaction can be set, and the browsing time threshold t can be set. If the user browses a certain text for a time period longer than t, or the user downloads the text, then y=1 is set, indicating that the user is interested in the text; and if the user has no interaction with the text, such as browsing or downloading, or the user browses a certain text for a time period less than t, then y=0 is set, indicating that the user is not interested in the text. Then, according to the user-historical text interaction matrix, the interaction triplet representing the user-text interaction data is constructed.

In the embodiment of the present disclosure, as shown in FIG. 7, step S602: according to the interaction triplet and the text knowledge graph, determining the text information of each of the historical texts, including:

S701: determining the text identification number of each historical text from the interaction triplet; and

S702: determining the text information of the historical text from the text knowledge graph according to the text identification number of each historical text.

In the specific implementation process, the specific implementation process of step S701 to step S702 is as follows. After the interaction triplet between the user and each of the historical texts is constructed, the text identification number of each of the historical texts can be determined from the interaction triplet, for example, the text id of each of the historical texts. Then, according to the text identification number of each of the historical texts, the text information of the historical text is determined from the text knowledge graph, for example, the publication number of the corresponding text is determined from the text knowledge graph according to the text id. Then, according to the correspondence between the publication number and the text, the text content of the text corresponding to the publication number is determined, so as to realize the determination of the text information of each of the historical texts.

In the embodiment of the present disclosure, as shown in FIG. 8, step S104: inputting the text embedding vector of each text into the trained graph convolutional network model to obtain the user's interaction probability for each text in the text collection, includes:

S801: determining an entity set and a relationship set included in each text in the text collection according to the text knowledge graph, wherein the entity set includes multiple entities, and the relationship set includes multiple relationships;

S802: determining the importance of the target relationship in the relationship set to the user according to the number of neighbors of the target entity in the entity set, wherein the larger the number of neighbors, the more neighbors connected to the target entity;

S803: determining the neighbor representation vector of the target entity according to the importance;

S804: aggregating the initial representation vector and the neighbor representation vector of the target entity to determine the first-order entity representation of the target entity, wherein if the target entity is a text entity, the embedding vector of the text is used as the initial representation vector;

S805: obtaining the final representation vector of the target entity, after passing through h layers of the trained graph convolutional network model, wherein h is a positive integer; and

S806: inputting the final representation vector and the user representation vector representing the user into a prediction function to obtain an interaction probability of the user with respect to the corresponding text.

In the specific implementation process, the specific implementation process of step S801 to step S806 is as follows. First, according to the text knowledge graph, the entity set and relationship set included in each text in the text collection are determined; and the entity set can be denoted as e, and the relationship set can be denoted as r, wherein the entity set includes multiple entities, and the relationship set includes multiple relationships. Then, according to the number of neighbors of the target entity in the entity set, the importance of the target relationship in the relationship set to the user is determined; and the larger the number of neighbors is, the larger the number of neighbors connected to the target entity is, the higher the popularity of the target entity is, and the higher the possibility of being followed by the user is. Then, according to the importance, a neighbor representation vector of the target entity is determined. Then, the initial representation vector and the neighbor representation vector of the target entity are aggregated to determine the first-order entity representation of the target entity; and if the target entity is a text entity, the text embedding vector of the text is used as the initial representation vector. The data in the text knowledge graph is stored in the form of triplets, and the head entities in all triplets belong to text entities. By recording the entity identification number of the head entity, a relationship between the entity identification number and the text entity is established, so that the text entity can be determined through the entity identification number.

After determining the first-order entity representation of the target entity, the final representation vector of the target entity is obtained after passing through the h layers of the trained graph convolutional network model, and h is a positive integer. In the iterative aggregation process of the trained graph convolutional network model, the neighborhood diverged by the user in the text knowledge graph is iteratively aggregated onto the target entity, and it is assumed that the entity located in the center is the target entity v, when extracting the user features, it is necessary to consider entities within the range of n hops in the text knowledge graph. One hop includes a complete triplet including the head entity-relationship-tail entity, and n is a positive integer. The neighbors of the target entity v within the range of one hop are composed of entities directly connected to the target entity v (there is the interaction between the neighbor and the target entity). Correspondingly, the neighbors within the range of two hops are composed of neighbors of entities directly connected to an entity e in the range of one hop, and so on. The neighbors extracted by the trained graph convolutional network model include n layers, then the aggregation operation of the model iterates n times in total, and the $i^{th}$ iteration aggregates neighborhood information for all entities within (n−i+1) layers. When the model converges to the layer 0, the aggregation operation is completed.

After obtaining the final representation vector of the target entity, the final representation vector and the user representation vector representing the user is input into the prediction function, to obtain the interaction probability of the user to the corresponding text. In this way, the texts that the user is interested in are screened out from the text collection based on the interaction probability of each of the texts, so as to realize the targeted recommendation to the user.

In the embodiment of the present disclosure, the following formula is used to determine the importance of the target relationship in the relationship set to the user:

$$\pi_r^u = u \cdot r + \alpha r, \text{ wherein,}$$

wherein, u represents the user representation vector of the user, r represents the vector representation of the target relationship, and α represents the number of neighbors of the target entity.

In the specific implementation process, the interests of different users may be different. For example, some users are interested in the patents applied by the same inventor, while some users may pay more attention to the technical field of the patent. The calculation of the importance of the target relationship in the relationship set to the user in the text recommender system is very important. Herein, u·r represents the score between the user u and the target relationship r, which can measure the user's degree of interest on different aspects of the text, for example, the user A pays more attention to the text in a certain technical field than the text of a certain inventor; and αr can be used to measure the popularity of the entity, wherein the larger the α is, the more neighbors connected to the entity are, indicating that the higher the popularity of the entity is, the higher the possibility of being followed by the user is. The number of neighbors of entities is added to the score calculation of the user relationship, which can more comprehensively reflect the potential interests of users and improve the accuracy of text recommendation.

In the embodiment of the present disclosure, the following formula is used to determine the first-order entity representation of the target entity:

$$agg = \sigma\left(w\left(v + v_{S(v)}^u\right) + b\right),$$

wherein, σ represents an activation function, w and b represent trainable parameters, v represents the initial representation vector of the target entity, and $$v_{S(v)}^u$$

represents the neighbor representation vector of the target entity.

In the embodiment of the present disclosure, the implementation process of training the graph convolutional network model to be trained to obtain the trained graph convolutional network model may refer to the description below, and will not be described in detail here.

Based on the same disclosed concept, as shown in FIG. 9, an embodiment of the present disclosure provides a model training method, which includes:

S901: obtaining the user's historical text retrieval information;

S902: determining a historical text collection retrieved by the user according to the historical text retrieval information, wherein the historical text collection includes at least one historical text;

S903: determining a text embedding vector corresponding to each of the historical texts based on the self-attention model; and S904: inputting the pre-built text knowledge graph and the text embedding vector corresponding to each historical text into the graph convolutional network model to be trained, training the graph convolutional network model to be trained, and obtaining a trained graph convolutional network model.

In the embodiment of the present disclosure, as shown in FIG. 10, after step S902: determining the historical text collection retrieved by the user according to the historical text retrieval information, the method further includes:

S1001: establishing an interaction triplet for representing the interaction between the user and each historical text according to the preset format of user identification number-text identification number-interaction relationship; and S1002: determining text information of each historical text according to the interaction triplet and the text knowledge graph.

In the embodiment of the present disclosure, as shown in FIG. 11, step S904: inputting the pre-built text knowledge graph and the text embedding vector corresponding to each historical text into the graph convolutional network model to be trained, and training the graph convolutional network model to be trained, and obtaining the trained graph convolutional network model, includes:

S1101: determining an entity set and a relationship set included in each historical text in the interaction triplet according to the text knowledge graph, wherein the entity set includes multiple entities, and the relationship set includes multiple relationships;

S1102: determining the importance of the target relationship in the relationship set to the user according to the number of neighbors of the target entity in the entity set, wherein the larger the number of neighbors, the more neighbors connected to the target entity;

S1103: determining the neighbor representation vector of the target entity according to the importance;

S1104: aggregating the initial representation vector and the neighbor representation vector of the target entity to determine the first-order entity representation of the target entity, wherein if the target entity is a text entity, the text embedding vector of the historical text is used as the initial representation vector;

S1105: obtaining the final representation vector of the target entity after passing through the h layers of the graph convolutional network model to be trained, wherein h is a positive integer; and S1106: inputting the final representation vector and the user representation vector representing the user into a prediction function, and predicting the predicted interaction probability of the user to the corresponding historical text;

S1107: calculating a loss value according to the predicted interaction probability and the user's interaction relationship to the corresponding historical text; and S1108: updating a weight of the graph convolutional network model to be trained by using the loss value to obtain the trained graph convolutional network model.

In the embodiments of the present disclosure, the specific implementation process of steps S1101-S1108 is as follows.

First, according to the text knowledge graph, the entity set and the relationship set included in each of the historical texts in the interaction triplet are determined, the entity set can be denoted as e, and the relationship set can be denoted as r, herein the entity set includes multiple entities, and the relationship set includes multiple relationships. Then, according to the number of neighbors of the target entity in the entity set, the importance of the target relationship in the relationship set to the user is determined; and the greater the number of neighbors is, the greater the number of neighbors connected to the target entity is, the higher the popularity of the target entity is, and the higher the possibility of being followed by the user is. Then, according to the importance, a neighbor representation vector of the target entity is determined. Then, the initial representation vector and the neighbor representation vector of the target entity are aggregated to determine the first-order entity representation of the target entity. If the target entity is a text entity, the text embedding vector of the historical text is used as the initial representation vector. The data in the text knowledge graph is stored in the form of triplets, and the head entities in all triplets belong to text entities. By recording the entity identification number of the head entity, an association relationship between the entity identification number and the text entity is established, so that the text entity can be determined through the entity identification number.

After determining the first-order entity representation of the target entity, the final representation vector of the target entity is obtained after passing through the h layers of the graph convolutional network model to be trained, and h is a positive integer. In the iterative aggregation process of the graph convolutional network model to be trained, the neighborhood diverged by the user in the text knowledge graph is iteratively aggregated on the target entity, and it is assumed that the entity located in the center is the target entity v, when extracting the user features, it is necessary to consider entities within the range of n hops in the text knowledge graph. One hop includes a complete triplet including the head entity-relationship-tail entity, and n is a positive integer. The neighbors of the target entity v within the range of one hop are composed of entities directly connected to the target entity v (there is the interaction between the neighbors and the target entity). Correspondingly, the neighbors within the range of two hops are composed of neighbors directly connected the entity e in the range of one hop, and so on. The neighbors extracted by the graph convolutional network model to be trained include n layers, then the aggregation operation of the model iterates n times in total, and the $i^{th}$ iteration aggregates neighborhood information for all entities within $(n-i+1)$ layers. When the model converges to the layer 0, the aggregation operation is completed.

After obtaining the final representation vector of the target entity, the final representation vector and the user representation vector representing the user are input into a prediction function to predict the predicted interaction probability of the user to the corresponding historical text. Then, according to the predicted interaction probability and the interaction relationship between the user and the corresponding historical text, the loss value is calculated, herein the interaction relationship between the user and the corresponding historical text is the real label; and then the loss value can be used to update the weight of the graph convolutional network model to be trained to obtain the trained graph convolutional network model.

Figure 12:
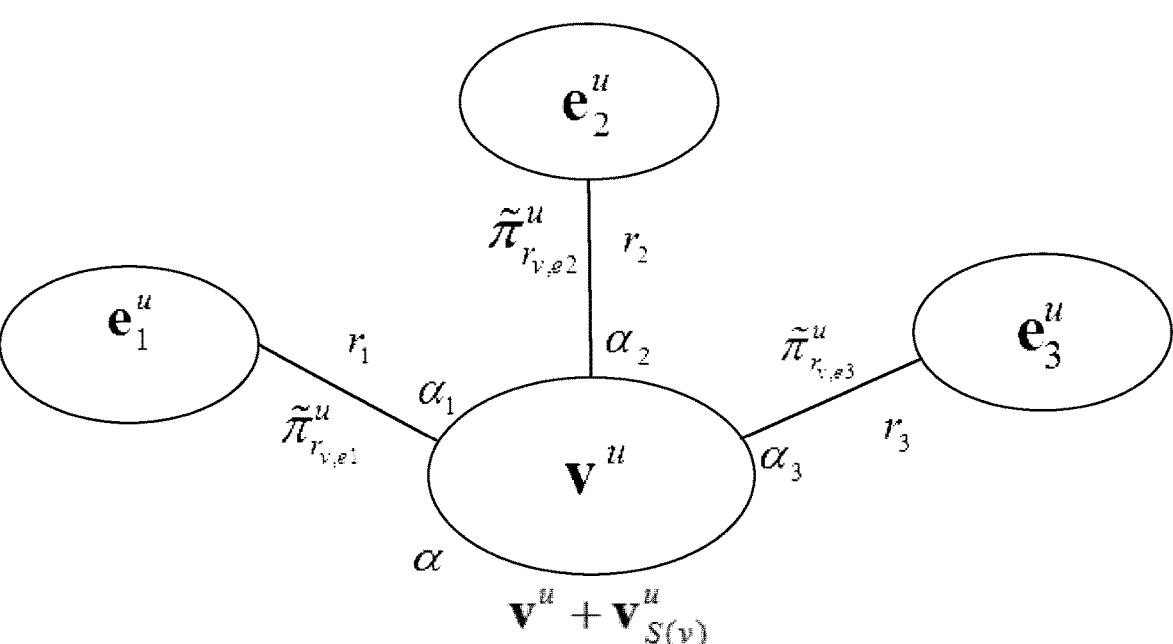
FIG. 12 is a schematic diagram of one layer structure of a graph convolutional network model to be trained in a model training method provided by an embodiment of the present disclosure.

The training process of the graph convolutional network model to be trained will be explained below in conjunction with the schematic diagram of one layer structure in the graph convolutional network model to be trained as shown in FIG. 12. Here, the number of neighbors $\alpha$ of the entity v is 3, the number of neighbors of the entity $e_1$ is $\alpha_1$, the number of neighbors of the entity $e_2$ is $\alpha_2$, the number of neighbors of the entity $e_3$ is $\alpha_3$, the relationship between the entity v and the entity $e_1$ is $r_1$, the relationship between the entity v and the entity $e_2$ is $r_2$, and the relationship between the entity v and the entity $e_3$ is $r_3$.

First, the importance of the target relationship to the user in the relationship set is calculated according to the formula:

$$\pi_r^u = u \cdot r + \alpha r; \qquad 5$$

and then the linear combination of the neighbors of the target entity is calculated to describe the neighbor representation information of the target entity, and the specific calculation formula as follows:

$$v_{N(v)}^u = \sum_{e \in N(v)} \tilde{\pi}_{r_{v,e}}^u e,$$

herein, $v$ represents the target entity, $N(v)$ represents a set of all neighbors of the target entity $v$, $$\tilde{\pi}_{r_{v,e}}^u = \frac{\exp\left(\pi_{r_{v,e}}^u\right)}{\sum\limits_{e \in N(v)} \exp\left(\pi_{r_{v,e}}^u\right)}$$

represents the normalized result, $r_{v,e}$ represents the relationship between the target entity $v$ and the neighbor e, and e represents a neighbor representation vector.

Since there are often large differences in the number of neighbors of each entity in the text knowledge graph, a fixed constant K can be used to randomly capture a fixed number of entity neighbor information, to ensure that each entity samples a fixed number of neighbors. For example, K is 4. Correspondingly, the neighbor representation information of the target entity $v$ is calculated as follows:

$$v_{S(v)}^u = \sum_{e \in S(v)} \tilde{\pi}_{r_{v,e}}^u e,$$

herein, $S(v)\square\{e|e\sim N(v)$ and $|S(v)|=K\}$, the set $S(v)$ contains K neighbors of the target entity $v$, and the number of neighbors in the set $S(v)$ may not be equal to the number of neighbors in the set $N(v)$, herein the number of neighbors in the set $S(v)$ may be greater than or less than the number of neighbors in the set $N(v)$. When the number of neighbors is greater than K, some relationships will be ignored, and when the number of neighbors is less than K, sampling will be repeated, so as to ensure the accuracy of text recommendation while ensuring the speed of text recommendation.

Then, the following formula is used to aggregate the own representation vector (i.e., the initial representation vector) and the neighbor representation vector of the target entity $v$, and the obtained result is used as the first-order entity representation of the target entity $v$. If the target entity $v$ is a patent entity, its corresponding text embedding vector is used for initialization; otherwise, the result of random initialization is used as the own representation vector of the target entity $v$, and the aggregation formula adopted may be additive aggregation:

$$agg = \sigma\left(w\left(v + v_{S(v)}^u\right) + b\right), \qquad 65$$

herein, $\sigma$ represents the activation function ReLU or tahn, w and b represent trainable parameters, $v$ represents the initial representation vector of the target entity, and $$v_{S(v)}^u$$

represents the neighbor representation vector of the target entity.

After obtaining the first-order entity representation of the target entity $v$, the final vector representation of the target entity v can be obtained after passing through the h layers of the graph convolutional network model to be trained.

Then, the final vector representation and the user representation vector of the user can be input into the prediction function $f$, and the predicted interaction probability $\hat{y}_{u,v}$ of the user to the corresponding text can be predicted by the following formula:

$$\hat{y}_{u,v} = f(u, v^u),$$

herein, the prediction function $f$ can be realized by MLP.

Then, the loss value can be calculated according to the predicted interaction probability $\hat{y}_{u,v}$ and the real label y of the corresponding text, and the loss value is used to update the weight of the graph convolutional network model to be trained. The loss function of the model is as follows:

$$L = \sum_{U} \left( \sum_{v:y_{u,v}=1} J\left(y_{u,v}, \hat{y}_{u,v}\right) - \sum_{i-1}^{T^u} J\left(y_{u_i,v_i}, \hat{y}_{u_i,v_i}\right) \right) + \lambda \|F\|_2^2,$$

here, J represents the cross-entropy loss, $T^u$ represents a set of patent entities that the user is not interested in, $\lambda$ represents the regularization parameter, and $$\|F\|_2^2$$

is the L2 penalty item. The above training process is repeated until the specified number of iterations is reached, the training ends, and the training weight of this model is saved, thereby obtaining the trained graph convolutional network model.

After the aforementioned graph convolutional network model to be trained is trained and the trained graph convolutional network model is obtained, when the user retrieves text through the text recommender system again, the retrieved patent collection can be input into the trained graph convolutional network model, and the prediction result of the trained graph convolutional network model is returned; and the text list with an interaction probability of 1 in the predicted result is recommended to the user, thus realizing personalized text recommendations to the user.

It should be noted that if the user has historical information retrieved on the text recommender system currently, that is, when there is historical text retrieval information for the user, the text recommendation for the user can be realized through online learning. That is, when each user uses the text recommender system, a recommendation model for the user needs to be retrained. The specific implementation process is as follows.

First, training data is built based on the user's historical text retrieval information; and the historical text retrieval information includes: which texts the user has searched for, how long the user has browsed on these texts, and whether there is a download behavior. According to these information and the aforementioned process of data construction, the user-text interaction data is constructed; the text information of relevant texts is extracted, and the embedding representation on the text information is performed by using the self-attention model, to obtain the text embedding vector of the corresponding text; and combined with the previously constructed text knowledge graph, the training data for online learning can be obtained. Then, the training process of online learning is performed; the pre-trained graph convolutional network model is constructed, the previously saved training weights are loaded, the weights of the pre-trained graph convolutional network model are freezed, and only the parameters of the prediction function are trained; and when the specified number of iterations is reached, the training ends, and the training weight of the current model is kept, to obtain the trained graph convolutional network model. Then, the prediction process is performed; and when the user retrieves the text through the text retrieval information again, the retrieved text is input into the trained graph convolutional network model, the prediction result of the model is returned, and the text list with the predicted interaction probability of 1 is returned to the user, so as to realize the text recommendation for the user.

When a user uses the text recommender system for text retrieval, if there is no historical text retrieval information of the user, that is, the user is a new user using the text recommender system, then according to text retrieval information input by the user, the text collection by using the text retrieval information is directly recommended to the user. In this case, the text recommender system does not predict the interaction probability, but only provides the text retrieval function. When a certain amount of historical text retrieval information is accumulated for the user, the online learning method can be invoked to retrain the parameters of the graph convolutional network model to be trained, and then the probability of text interaction can be predicted for the user, thereby improving the accuracy of text recommendations.

The principle of solving the problem by the model training method provided by the embodiment of the present disclosure is similar to the aforementioned text recommendation method. Therefore, the specific implementation process of steps S901-S904 and S1001-S1002 can refer to the description of relevant parts in the aforementioned text recommendation method, which will not be repeated.

Based on the same disclosed concept, an embodiment of the present disclosure further provides a text recommendation apparatus, which includes: a first memory and a first processor; wherein the first memory is configured to store computer programs; and the first processor is configured to execute the computer programs in the first memory to perform:

obtaining the text retrieval information from the user;

when determining that there is historical text retrieval information of the user, determining the text information of each text in the text collection retrieved by using the text retrieval information, wherein the text collection includes at least one text;

determining a text embedding vector for each text based on a self-attention model;

inputting the text embedding vector of each text into the trained graph convolutional network model to obtain the user's interaction probability for each text in the text collection, wherein the trained graph convolutional network model is constructed based on the pre-built text knowledge graph and the historical text retrieval information for the user; and screening out a target text meeting a preset interaction probability from the text collection, and recommending the target text to the user.

Based on the same disclosure concept, an embodiment of the present disclosure also provides a model training apparatus, which includes: a second memory and a second processor; wherein the second memory is configured to store computer programs; and the second processor is configured to execute the computer programs in the second memory to perform:

obtaining the user's historical text retrieval information;

determining a historical text collection retrieved by the user according to the historical text retrieval information, wherein the historical text collection includes at least one historical text;

determining the text embedding vector corresponding to each of the historical texts based on the self-attention model; and inputting the pre-built text knowledge graph and the text embedding vector corresponding to each of the historical texts into the graph convolutional network model to be trained, training the graph convolutional network model to be trained, and obtaining the trained graph convolutional network model.

Based on the same disclosure concept, an embodiment of the present disclosure also provides a computer-readable storage medium, wherein: the readable storage medium stores computer instructions; and the computer instructions, when run on the computer, cause the computer to execute the any text recommendation method described above or the any model training method described above.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of a computer program product implemented on one or more computer-usable storage media (including but not limited to disk storage, compact disc read-only memory (CD-ROM), optical storage, etc.) having computer-usable program codes therein.

The present disclosure is described with reference to flowcharts and/or block diagrams of methods, apparatus (systems), and computer program products according to the present disclosure. It should be understood that each procedure and/or block in the flowchart and/or block diagram, and a combination of procedures and/or blocks in the flowchart and/or block diagram can be realized by computer program instructions. These computer program instructions may be provided to a general purpose computer, special purpose computer, embedded processor, or processor of other programmable data processing device to produce a machine, such that the instructions executed by the processor of the computer or other programmable data processing device produce an apparatus for realizing the functions specified in one or more procedures of the flowchart and/or one or more blocks of the block diagram.

These computer program instructions may also be stored in a computer-readable memory capable of directing a computer or other programmable data processing device to operate in a specific manner, such that the instructions stored in the computer-readable memory produce an article of manufacture including the instruction device, and the instruction device realizes the function specified in one or more procedures of the flowchart and/or one or more blocks of the block diagram.

These computer program instructions can also be loaded onto a computer or other programmable data processing device, causing a series of operational steps to be performed on the computer or other programmable device to produce a computer-implemented process, so that the instructions performed on the computer or other programmable device provide steps for implementing the functions specified in one or more procedures of the flowchart and/or one or more blocks of the block diagram.

While preferred embodiments of the present disclosure have been described, additional changes and modifications can be made to these embodiments by those skilled in the art once the basic inventive concept is appreciated. Therefore, it is intended that the appended claims be construed to cover the preferred embodiment and all changes and modifications which fall within the scope of the present disclosure.

Obviously, those skilled in the art can make various changes and modifications to the application without departing from the spirit and scope of the disclosure. In this way, if these modifications and variations of the present disclosure fall within the scope of the claims of the present disclosure and their equivalent technologies, the present disclosure is also intended to include these modifications and variations.

What is claimed is:

1. A text recommendation method, comprising:
obtaining text retrieval information from a user;
determining text information of each text in a text collection retrieved by using the text retrieval information in a case of determining there is historical text retrieval information of the user, wherein the text collection comprises at least one text;
performing an embedding representation on the text information of each text based on a self-attention model to determine a text embedding vector of each text;
inputting the text embedding vector of each text into a trained graph convolutional network model to obtain an interaction probability of the user for each text in the text collection, wherein the trained graph convolutional network model is constructed based on a pre-built text knowledge graph and the historical text retrieval information for the user; and
screening out a target text meeting a preset interaction probability from the text collection, and recommending the target text to the user;
wherein before obtaining the text retrieval information from the user, the method further comprises: constructing the text knowledge graph according to a preset text resource library, wherein the text knowledge graph comprises multiple triplets in a format of head entity-relationship-tail entity, and each of the multiple triplets comprises an entity set comprising a head entity and a tail entity and a relationship set representing a relationship between the head entity and the tail entity;
wherein before obtaining the text retrieval information from the user, the method further comprises: obtaining the historical text retrieval information of the user; determining a historical text collection retrieved by the user according to the historical text retrieval information, wherein the historical text collection comprises at least one historical text; determining a text embedding vector corresponding to each of the historical texts based on the self-attention model; and inputting the text knowledge graph and the text embedding vector corresponding to each of the historical texts into a graph convolutional network model to be trained, training the graph convolutional network model to be trained, and obtaining the trained graph convolutional network model;
wherein after determining the historical text collection retrieved by the user according to the historical text retrieval information, the method further comprises: establishing an interaction triplet for representing an interaction between the user and each historical text according to a preset format of user identification number-text identification number-interaction relationship; and determining text information of each historical text according to the interaction triplet and the text knowledge graph.

2. The method according to claim 1, wherein after determining the text information of each text in the text collection retrieved by using the text retrieval information, the method further comprises:
extracting summary information from the text information of each text, wherein the summary information represents a generalized expression of the text;
wherein the performing of the embedding representation on the text information of each text based on the self-attention model to determine the text embedding vector of each text, comprises:
performing an embedding representation on the summary information of each text based on the self-attention model to determine a summary embedding vector of each text, and using the summary embedding vector as the text embedding vector of the text.

3. The method according to claim 1, wherein before performing the embedding representation on the text information of each text based on the self-attention model to determine the text embedding vector of each text, the method further comprises:
performing data cleaning on the text information of each text, removing stop words, and obtaining cleaned data; and
determining a corresponding word embedding vector according to the cleaned data of the text information of each text.

4. The method according to claim 3, wherein the determining of the corresponding word embedding vector according to the cleaned data of the text information of each text, comprises:
segmenting the cleaned data of the text information of each text into words, and converting each of the words in the cleaned data into a corresponding word identification number according to dictionary information of the self-attention model; and
using the word identification number as a word embedding vector of the text information.

5. The method according to claim 4, wherein after converting each word in the cleaned data into the corresponding word identification number, the method further comprises:
determining an identification number sequence corresponding to the text information of each text and a corresponding sequence length; and
processing the cleaned data corresponding to the text information of each text to adjust the corresponding identification number sequence to a preset sequence length.

6. The method according to claim 1, wherein the inputting of the text embedding vector of each text into the trained graph convolutional network model to obtain the interaction probability of the user for each text in the text collection, comprises:

determining an entity set and a relationship set comprised in each text in the text collection according to the text knowledge graph, wherein the entity set comprises multiple entities, and the relationship set comprises multiple relationships;

determining an importance of a target relationship in the relationship set to the user according to a quantity of neighbors of a target entity in the entity set, wherein the larger the quantity of neighbors, the more neighbors connected to the target entity;

determining a neighbor representation vector of the target entity according to the importance;

aggregating an initial representation vector and the neighbor representation vector of the target entity to determine a first-order entity representation of the target entity, wherein in a case that the target entity is a text entity, the text embedding vector of the text is used as the initial representation vector;

obtaining a final representation vector of the target entity after passing through h layers of the trained graph convolutional network model, wherein h is a positive integer; and inputting the final representation vector and a user representation vector representing the user into a prediction function to obtain an interaction probability of the user to a corresponding text.

7. The method according to claim 6, wherein the importance of the target relationship in the relationship set to the user is determined by a following formula:

$$\pi_r^u = u \cdot r + \alpha r,$$

wherein u represents the user representation vector of the user, r represents a vector representation of the target relationship, and $\alpha$ represents the quantity of neighbors of the target entity.

8. The method according to claim 6, wherein the first-order entity representation of the target entity is determined by a following formula:

agg=$\sigma(w(v+v_{S(v)}^u)+b)$, wherein $\sigma$ represents an activation function, w and b represent trainable parameters, v represents the initial representation vector of the target entity, and $v_{S(v)}^u$ represents the neighbor representation vector of the target entity.

9. A non-transitory computer-readable storage medium, wherein: the computer-readable storage medium stores computer instructions; and the computer instructions, when run on the computer, cause the computer to execute the text recommendation method according to claim 1.

10. The method according to claim 1, wherein the determining of the text information of each historical text according to the interaction triplet and the text knowledge graph, comprises:

determining the text identification number of each historical text from the interaction triplet; and determining the text information of the historical text from the text knowledge graph according to the text identification number of each historical text.

11. A non-transitory computer-readable storage medium, wherein: the computer-readable storage medium stores computer instructions; and the computer instructions, when run on the computer, cause the computer to execute the text recommendation method according to claim 2.

12. A model training method, comprising:

obtaining historical text retrieval information of a user;

determining a historical text collection retrieved by the user according to the historical text retrieval information, wherein the historical text collection comprises at least one historical text;

determining a text embedding vector corresponding to each of the historical texts based on a self-attention model; and inputting a pre-built text knowledge graph and the text embedding vector corresponding to each historical text into a graph convolutional network model to be trained, training the graph convolutional network model to be trained, and obtaining a trained graph convolutional network model;

wherein after determining the historical text collection retrieved by the user according to the historical text retrieval information, the method further comprises:

establishing an interaction triplet for representing an interaction between the user and each historical text according to a preset format of user identification number-text identification number-interaction relationship; and determining text information of each historical text according to the interaction triplet and the text knowledge graph.

13. The method according to claim 12, wherein an operation of inputting the pre-built text knowledge graph and the text embedding vector corresponding to each historical text into the graph convolutional network model to be trained, training the graph convolutional network model to be trained, and obtaining the trained graph convolutional network mode, comprises:

determining an entity set and a relationship set comprised in each historical text in the interaction triplet according to the text knowledge graph, wherein the entity set comprises a plurality of entities, and the relationship set comprises a plurality of relationships;

determining an importance of a target relationship in the relationship set to the user according to a quantity of neighbors of a target entity in the entity set, wherein the larger the quantity of neighbors, the more neighbors connected to the target entity;

determining a neighbor representation vector of the target entity according to the importance;

aggregating an initial representation vector and the neighbor representation vector of the target entity to determine a first-order entity representation of the target entity, wherein in a case that the target entity is a text entity, the text embedding vector of the historical text is used as the initial representation vector;

obtaining a final representation vector of the target entity after passing through h layers of the graph convolutional network model to be trained, wherein h is a positive integer;

inputting the final representation vector and the user representation vector representing the user into a prediction function to predict a predicted interaction probability of the user to a corresponding historical text;

calculating a loss value according to the predicted interaction probability and the interaction relationship of the user to the corresponding historical text; and updating a weight of the graph convolutional network model to be trained by using the loss value to obtain the trained graph convolutional network model.

14. A model training apparatus, comprising:

a second memory and a second processor;

wherein the second memory is configured to store computer programs; and the second processor is configured to execute the computer programs in the second memory to perform the model training method according to claim 12.

15. A non-transitory computer-readable storage medium, wherein: the computer-readable storage medium stores computer instructions; and the computer instructions, when run on the computer, cause the computer to execute the model training method according to claim 12.

16. A text recommendation apparatus, comprising:

a first memory and a first processor;

wherein the first memory is configured to store computer programs; and the first processor is configured to execute the computer programs in the first memory to perform:

obtaining text retrieval information from a user;

determining text information of each text in a text collection retrieved by using the text retrieval information in a case of determining there is historical text retrieval information of the user, wherein the text collection comprises at least one text;

determining a text embedding vector for each text based on a self-attention model;

inputting the text embedding vector of each text into a trained graph convolutional network model to obtain an interaction probability of the user for each text in the text collection, wherein the trained graph convolutional network model is constructed based on a pre-built text knowledge graph and the historical text retrieval information for the user; and screening out a target text meeting a preset interaction probability from the text collection, and recommending the target text the user;

wherein the first processor is further configured to execute the computer programs in the first memory to perform: constructing the text knowledge graph according to a preset text resource library, wherein the text knowledge graph comprises multiple triplets in a format of head entity-relationship-tail entity, and each of the multiple triplets comprises an entity set comprising a head entity and a tail entity and a relationship set representing a relationship between the head entity and the tail entity;

wherein the first processor is further configured to execute the computer programs in the first memory to perform: obtaining the historical text retrieval information of the user; determining a historical text collection retrieved by the user according to the historical text retrieval information, wherein the historical text collection comprises at least one historical text; determining a text embedding vector corresponding to each of the historical texts based on the self-attention model; and inputting the text knowledge graph and the text embedding vector corresponding to each of the historical texts into a graph convolutional network model to be trained, training the graph convolutional network model to be trained, and obtaining the trained graph convolutional network model;

wherein the first processor is further configured to execute the computer programs in the first memory to perform: establishing an interaction triplet for representing an interaction between the user and each historical text according to a preset format of user identification number-text identification number-interaction relationship; and determining text information of each historical text according to the interaction triplet and the text knowledge graph.

\* \* \* \* \*